C. H. FRINK.
REPEATING DEVICE FOR TALKING MACHINES.
APPLICATION FILED NOV. 13, 1917.
1,274,157.
Patented July 30, 1918.
4 SHEETS—SHEET 1.
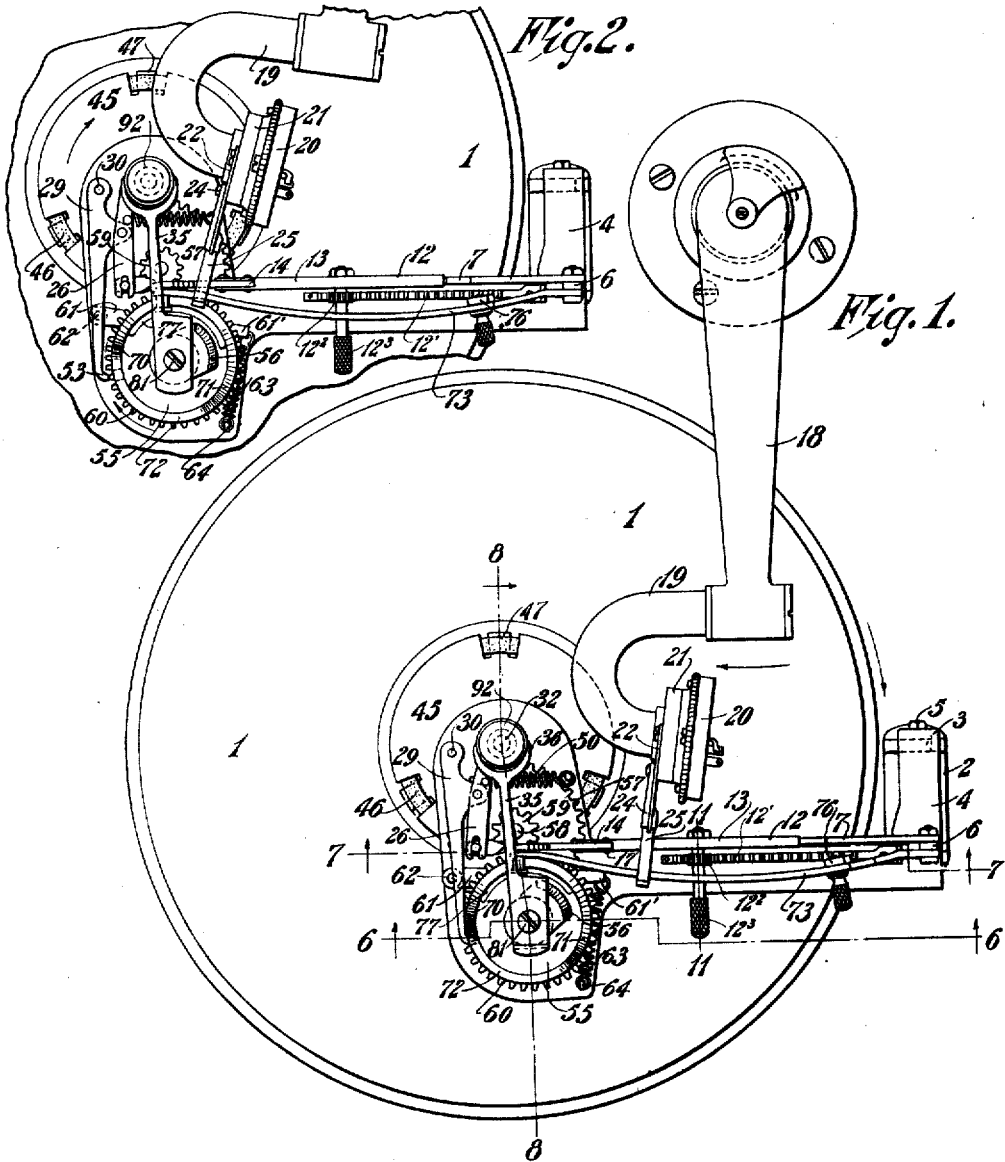
WITNESS:
B. A. Seaver
INVENTOR,
Charles H. Frink,
BY
Harry W. Bourn
ATTORNEY.

C. H. FRINK.
REPEATING DEVICE FOR TALKING MACHINES.
APPLICATION FILED NOV. 13, 1917.

1,274,157.

Patented July 30, 1918.
4 SHEETS—SHEET 2.

INVENTOR,
Charles H. Frink,
BY
Harry W. Bourn
ATTORNEY.

C. H. FRINK.
REPEATING DEVICE FOR TALKING MACHINES.
APPLICATION FILED NOV. 13, 1917.

1,274,157.

Patented July 30, 1918.
4 SHEETS—SHEET 3.

INVENTOR,
Charles H. Frink.
BY
Harry W. Brown.
ATTORNEY.

C. H. FRINK.
REPEATING DEVICE FOR TALKING MACHINES.
APPLICATION FILED NOV. 13, 1917.
1,274,157.
Patented July 30, 1918.
4 SHEETS—SHEET 4.
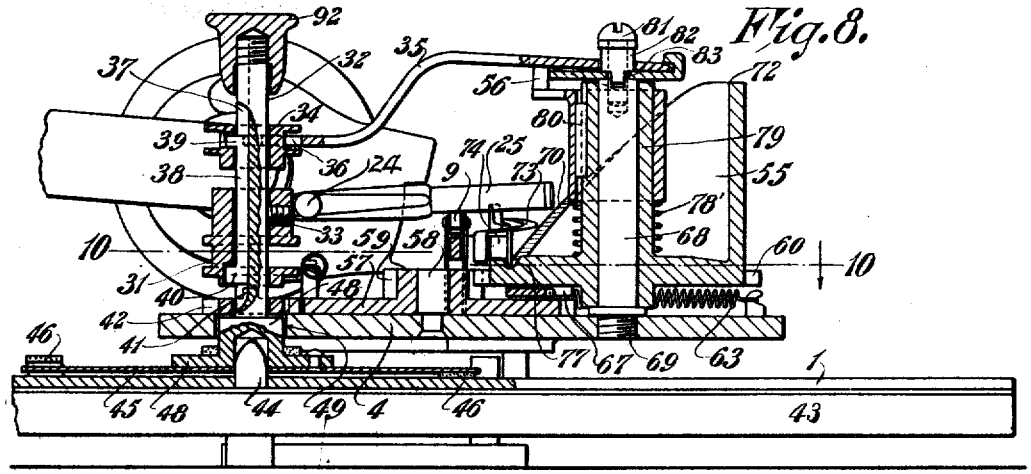
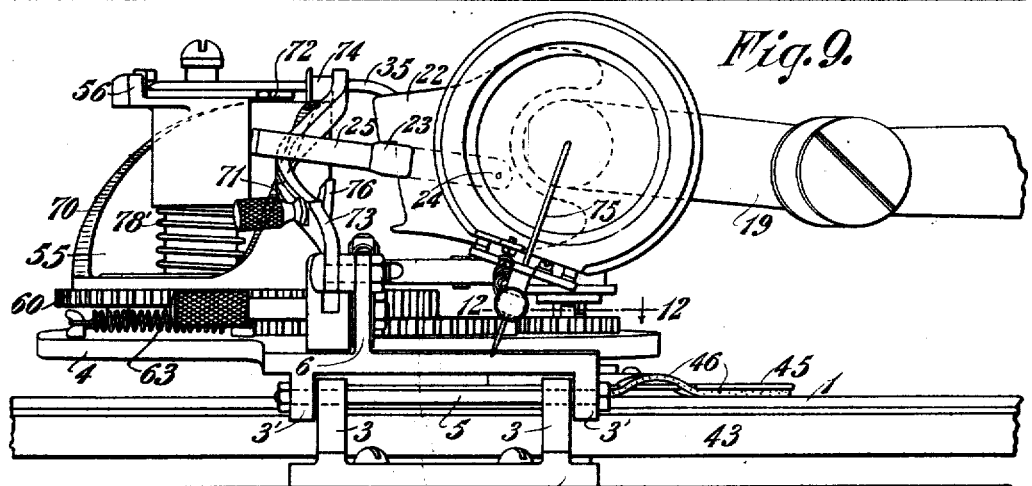
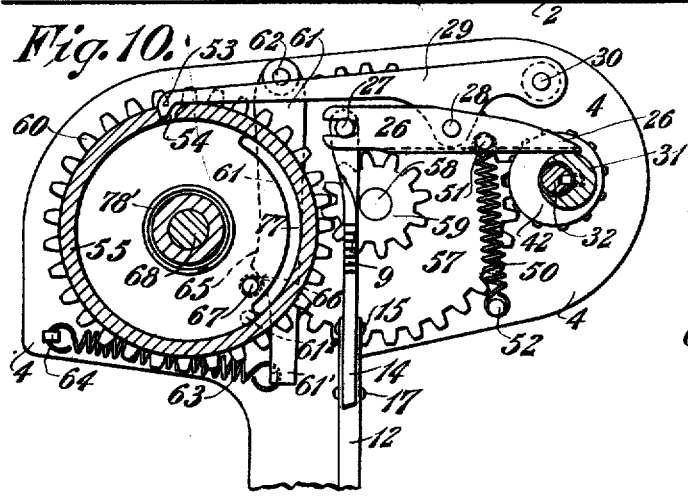
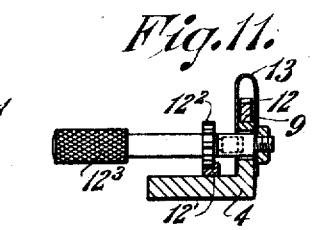
INVENTOR,
Charles H. Frink,
BY
Harry W. Bown.
ATTORNEY.

UNITED STATES PATENT OFFICE.

CHARLES H. FRINK, OF NORTHAMPTON, MASSACHUSETTS.

REPEATING DEVICE FOR TALKING-MACHINES.

1,274,157.　　　Specification of Letters Patent.　　Patented July 30, 1918.

Application filed November 13, 1917. Serial No. 201,862.

*To all whom it may concern:*

Be it known that I, CHARLES H. FRINK, a citizen of the United States, residing at Northampton, in the county of Hampshire and Commonwealth of Massachusetts, have invented certain new and useful Improvements in Repeating Devices for Talking-Machines, of which the following is a specification.

This invention relates to improvements in devices for repeating the playing of a record on a talking machine or phonograph, the purpose of which is to repeat the playing of the record any number of times desired without requiring the attention of the operator other than to rewind the motor where the motor is hand wound and the needle is not required to be changed. The invention, while it is shown in the drawings as being applied to a Victor talking machine may of course be applied to other makes. The invention broadly considered, comprises a track element along which an attachment which is connected to the arm of the machine travels, and, at the inward end of its travel, or where the record terminates, the device is automatically tripped, whereby the needle or stylus is immediately removed from its contact with the record and lifted vertically away from the record, and a device for permitting the arm to be carried backward or returned to its initial position on the record, or, if desired, the device may be so adjusted as to permit the playing of a definite portion of the record, as the chorus or latter part of a song. In this class of attachments for talking machines, it is necessary that the needle be lifted quickly, away from the record, in order not to injure the same, and to be returned into contact with the same without imparting a blow that would in any manner injure the record. The device is designed to operate automatically in repeating the playing of the record any number of times desired until the machine is stopped.

Referring to the drawings:

Figure 1 is a plan view showing the general arrangement and construction of the device as a whole.

Fig. 2 is a plan view showing the position of the parts at the instant that the needle and sound box reaches the inner limit of its travel and the device is tripped and at the instant the needle is about to be lifted upward away from the record.

Fig. 8 is a vertical sectional view taken on a plane on the line 8—8 of Fig. 1, looking in the direction of the arrow.

Fig. 9 is an end elevational view showing the arm of the instrument which supports the needle and sound box.

Fig. 10 is a horizontal sectional view taken in a plane represented by the line 10—10 of Fig. 8, looking downward.

Fig. 11 is a transverse sectional view on the line 11—11 of Fig. 1.

Figure 3:
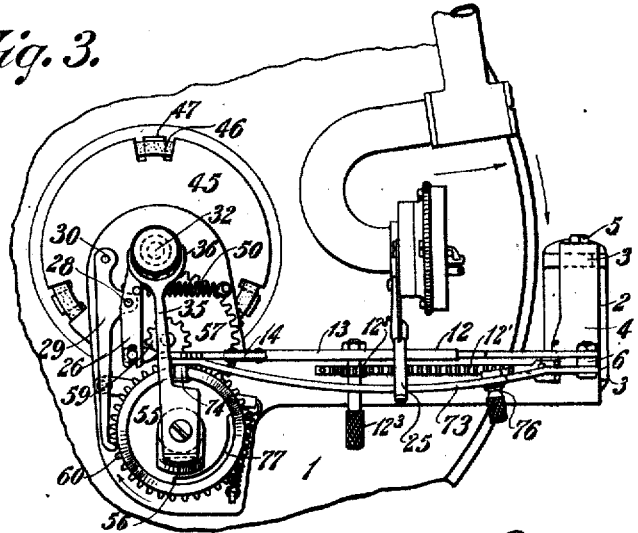
Fig. 3 is a plan view, similar to Fig. 2, but showing the position of the parts with the arm of the machine moving backward or outward to its initial position.

Referring to the drawings in detail: The record containing the piece to be played is indicated at 1. The device is attached to the upper surface of the talking machine by means of screws passing through the base piece 2, and which is formed with a pair of upwardly projecting ears 3. Attached to the ears 3 is a base plate 4 by means of the pin 5, which extends through the ears and depending ears 3' in the plate 4. Extending upwardly from the plate 4 is a projection 6, to which is pivotally connected an arm 7. This arm is formed with a cut out portion 8 and located in this cut out portion is a reciprocable rack bar 9, the teeth 10 of which are formed with vertical surfaces 11. Located over the bar 7 is an adjustable hood or casing member 12. This casing is made from sheet metal and formed with an upper curved surface 13 (see Fig. 11) and serves to confine and hold in place the reciprocating rack bar 9. The casing member 12 is adjusted by means of the rack and pinions 12', 12² and knob 12³. Pivotally connected to the casing 12 is a pawl 14, attached thereto by means of the pivot 15. This pawl is formed with an extension 16 which normally rests upon the pin 17. The usual arm of the talking machine is indicated at 18, to which the usual goose neck 19 is pivotally connected. The sound box is indicated at 20, to which the usual needle is secured. Secured to the rubber or base portion 21 of the sound box is a plate 22, which is shown in side elevation in Fig. 9. Attached to this plate is a rod 23 by means of the pivot 24. Mounted on the rod 23 is a rotatable sleeve 25. This sleeve as shown in Fig. 1, travels on the upper curved edge 13 of the adjustable casing 12. The pivot 24 permits the rod and sleeve 25 to rise and fall during the playing of the record, since the turntable of the talking machine very seldom rotates in a true horizontal plane.

Figure 7:
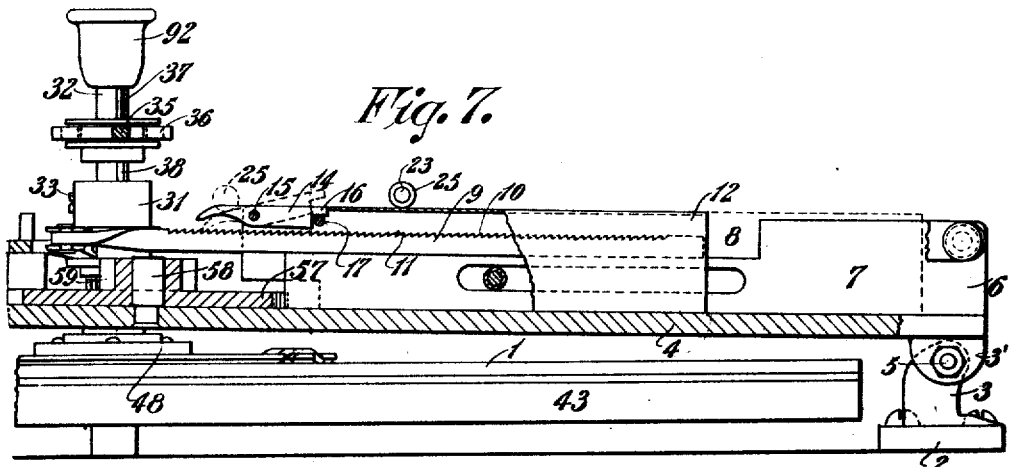
Fig. 7 is a vertical sectional view on the line 7—7 of Fig. 1.

Connected to the inner end of the rack bar 9 is a rocking lever 26 by means of the slot and pin connection 27. The lever 26 is pivotally connected at 28 to a latch lever 29 which, as will be described later, is to hold the cam barrel locked against movement when the record is being played. Lever 29 is pivotally secured to the plate 4 by means of the pin 30. The opposite end of the lever 26 is normally held in contact with the cam 31 by means of the spring 50 and which is driven from the motor of the machine by means of the upright shaft 32. Cam 31 is secured to the shaft 32 by means of the set screw 33. (See Fig. 8). Loosely mounted on the shaft 33 is a collar 34, to which the shift lever 35 is connected by means of the fork 36. The operation of the shift lever 35 will be fully described later in connection with the operation of the machine. The shaft 32 is grooved as indicated at 37 (see Fig. 8) and located in this groove is a U-shaped key 38. This key is connected at its upper end to the collar 34 by means of the lip 39. The lower lip, or projection 40 is designed to engage the projections 41 on the upper side of the gear 42 when the motor which continuously drives the shaft 32 and the turntable is to be connected to the operative parts of this attachment for lifting the needle from the record and returning the same into contact with the record. The turntable is indicated by the numeral 43, which is driven by the motor of the machine. The usual centering pin for the record is indicated at 44 and extends through the record 1. 45 is a plate or disk that is held in frictional engagement with the record 1 by means of the rubber padding or ring 46. The plate 45, plan view of which is shown in Figs. 1, 2, 3 and 4, is formed with tongues 47 for locking the rubber ring 46 around the same; the major portion of the ring 46 lies below the plate 45, and is therefore in contact with the upper surface of the record 1. Attached to the plate 45 is a hub 48 which receives the centering pin 44. The upper end of the hub 48 enters an opening 49 in the base plate 4. As shown in Fig. 8, the opening 49 being larger than the hub 48, whereby when the turntable 43 rotates, carrying with it the phonograph record 1, the hub 48 will have free movement in the opening 49 in order to take up any unevenness in the travel of the turntable and the record. The shaft 32, previously referred to, forms an integral part of the hub 48. As shown in Figs. 1, 2, 3, 8 and 10, the turntable and the record are free to rotate without operating any part of the device other than the lever 26 and the rack bar 9. 50 previously mentioned, designates a coiled spring, one end of which is connected to the rocking lever 26 at 51 and to the base piece 4 by means of the fixed pin 52. This spring normally holds the outer end of the lever 26 in contact with the cam 31. In the position of the parts described, the rack bar 9 is being normally reciprocated back and forth. When the roller 25, which is connected to the sound box 20 reaches the dotted line position shown in Fig. 7, the pawl 14 is tripped or thrown downward into the dotted line position, its inner end engaging the shoulder 11 of one of the teeth 10, causing the bar 9 to be locked to the pawl. When this operation occurs, the lever 26 which is being continually rocked by reason of its engagement with the cam 31, will instantly push outward against the lever 29, causing the outer end 53 of the lever 29 to be moved out of the opening or recess 54 in the cam barrel 55. The lever 29 is thus moved from its normally locking position shown in Figs. 1 and 10 to that shown in Figs. 2, 3, 4, 5 and 6. When this operation takes place, the shift lever 35 passes or drops from the shoulder 56. (See Fig. 8). This movement of the lever 35 permits the U-shaped key 38 to fall by gravity and the projection 40 at the lower end of this key to engage one of the projections 41 on the upper side on the gear 42, which operation connects the shaft 32 to the train of gearing and causes the motor of the talking machine to be connected to the gear 42, which gear in turn rotates the gear 57, which is mounted on the stud 58. (See Fig. 8.). Formed integral with the gear 57 is a pinion 59, the teeth of which engages the teeth 60 at the bottom of the cam barrel 55 causing the barrel 55 to be driven from the motor of the machine. Attached to the base piece 4, at the point 62 is a cam lever 61. This lever extends in a direction parallel with the rack bar 9 (see Fig. 10) and below the lower end of the cam barrel 55. Its outer end 61' is connected to a coiled spring 63 and this spring is secured to the plate 4 as indicated at 64. The lever 61 is formed with two cam surfaces 65 and 66. Engaging these surfaces is a pin 67, which is secured to the lower side of the cam barrel 55. 61² is a stop for lever 61. The purpose of the cam surface is to impart an initial rotary movement to the cam barrel 55 at the instant that the projection 53 of the latch lever 29 is withdrawn from the opening 54 in the cam barrel 55. Secured to the plate 4 is a post 68 by means of the threads 69. (See Fig. 8). The cam barrel 55 is rotatably mounted upon this post. This barrel is formed with two cam surfaces 70 and 71, and its upper edge with a flat surface 72. For the purpose of raising the needle away from the record, an arm or lever 73 is pivoted to the projection 6 on the base plate 4. The inner end of this lever is provided with a roller 74, which travels up the cam surface 71, across the horizontal upper edge 72 of the cam barrel and down the cam surface 70. The operation of this lever commences the instant the roller 25 tilts the pawl 14 into engagement with the reciprocable rack bar 9. The roller 25 then lies on the inner end of the lever 73 (see Fig. 1) and when the latch lever 29 is disengaged from the opening 54 of the cam barrel 55 the roller 74, by reason of the rotation of the cam barrel will travel up the almost vertically formed cam surface 71, thus elevating the needle 75 by reason of the rotatable connection of the goose neck 19. The lever 73 will be placed in the inclined position shown in Figs. 3 and 5 with the roller 25 traveling downward to its initial position, or until it engages the adjustable stop 76. The inner end of the lever 73 is now traveling across the horizontal surface 72 at the upper end of the cam barrel. After the roller 25 and the needle 75 have reached the end or initial position of its downward travel, the roller 74 then commences the descent of the cam surface 70 for bringing the needle again into contact with the record.

Figure 4:
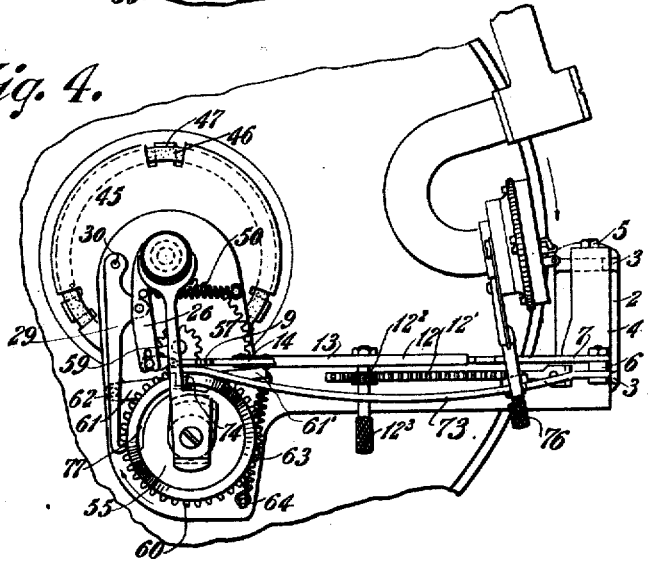
Fig. 4 illustrates the position of the arm of the machine after it has been returned to its initial position.
Figure 12:
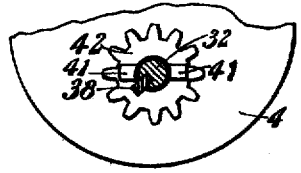
Fig. 12 is a horizontal sectional view taken on the line 12—12 of Fig. 9.
Figure 5:
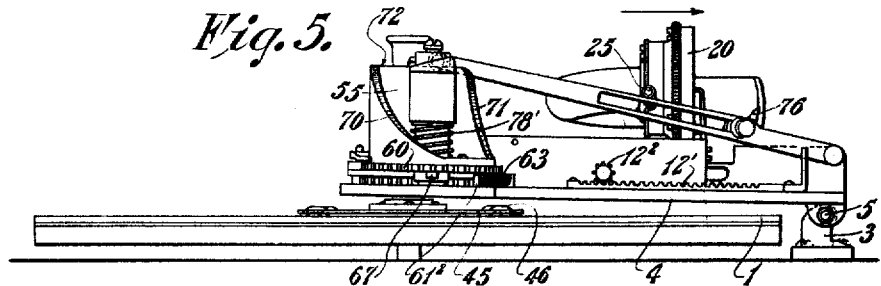
Fig. 5 is a side elevational view showing the arm which returns the sound box and needle elevated, and, with the sound box and needle traveling by gravity back to their initial position.
Figure 6:
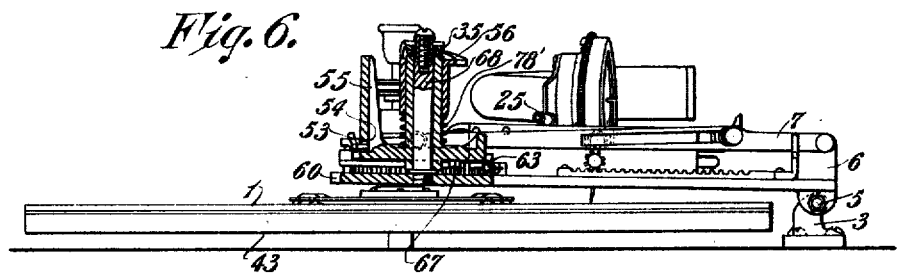
Fig. 6 is a vertical sectional view on the line 6—6 of Fig. 1.

Fig. 4 shows the position of the arm 73 down which the roller 25 travels after the roller 74 has again reached its original horizontal position as shown in Figs. 1, 2 and 8, when the cam barrel 55 is again locked by the latch lever 29. 77 designates a groove in the bottom of the cam barrel to receive the flange of the roller 74. (See Figs. 1, 2, 4, 8). The moment the roller 74 reaches the bottom of cam surface 71 the end 53 of the latch lever 29 passes again into the opening 54 to again lock this barrel against rotary movement.

Figure 13:
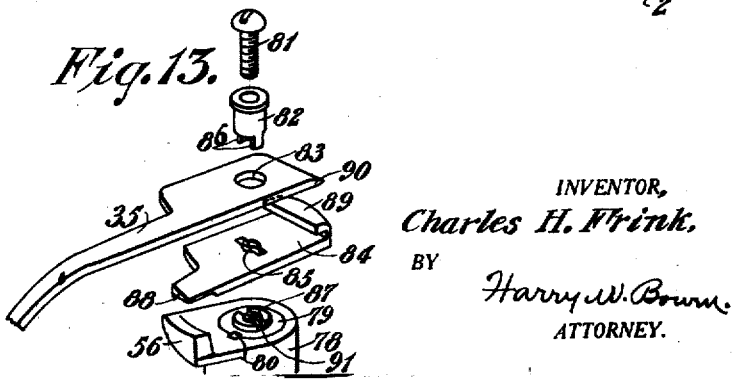
Fig. 13 is a separated view of the cam mechanism for operating the shift lever.

In order to unlatch the U shaped key 38 from the gear 41 and disconnect the shaft 32 from the motor of the talking machine and prevent the train of gearing between the cam barrel 55 being operated, the shift arm 35 is at this moment elevated to lift the sleeve 34 to which the U-shaped key 38 is connected. This arm is raised by means of the cam 56, (see Figs. 6, 8 and 13) which cam forms a part of the sleeve 78 that is slidably mounted on the hub 79 of the cam barrel 55. This sleeve is normally elevated by the spring 78'. A spline 80 connects the sleeve 78 to the hub of the cam barrel. The sleeve 78 can, therefore, rotate with the cam barrel. The sleeve 78 is secured to the post 68 by means of the screw 81, which passes through the sleeve 82, which is located in an opening 83, in the inner end of the shift lever 35.

84 designates a plate formed with a key hole slot 85 to receive the wings 86 of the sleeve 82. The screw 81 enters the threaded opening 87 in the post 68 for holding the parts together. The plate 84 is formed with an inclined cam surface 88 and an overhanging lip 89 to receive the inclined end 90 of the shift arm 35. The parts are shown separated in Fig. 13 and assembled in Figs. 8 and 9. The operation of this portion of my invention is as follows:

Before the inner end of the latch lever 29 is withdrawn from the opening 54 of the cam barrel, the shift lever 35 is at that moment held elevated by the cam 56 and when the cam barrel is released by the withdrawal of the lever 29 and the barrel is given an initial rotary movement by reason of the cam surface 66 on the lever 61 and pin 67 on the cam barrel, the lip 88 passes from the cam 56 and allows the shift lever 35 to drop, causing the U-shaped key 38 to engage the projections 41 on the gear 42 and connect the motor of the instrument to the cam barrel. As the barrel rotates to effect the lifting and returning of the needle the sleeve 78 is carried around with the barrel. The plate 84 is prevented from rotating and it is locked to the post 79 by the projection 86 on the sleeve 82, engaging the recesses 91 in the top of the post. As the sleeve 78 is rotated the cam surface 88 travels up the cam 56 and when the barrel 55 comes to a standstill, the lip 88 is in the position shown in Fig. 8 in which position the device is ready for another series of operations as soon as the roller 25 trips the pawl 14 shown in Fig. 7 and effects the removal of the locking latch 29 from the cam barrel 55.

From this description it will be seen that I have produced a device that can be readily attached to a talking machine of the "Victor" or "Grafonola" type for automatically and continuously repeating the playing of the record. It will also be seen that the record can be easily inserted by lifting the device by means of the knob 92 shown in Figs. 5, 7 and 8, whereby the entire device can be turned upward on the pin 5.

What I claim is:

1. A device for attachment to a phonograph for continuously and automatically repeating the playing of the record and comprising, in combination, a base-piece, a member connected to the needle carrying part of the instrument, a rack-bar, a pawl operated by the instrument during its usual travel for moving the pawl into engagement with the rack bar, a needle elevating mechanism, means operated by the rack bar for effecting the operation of the needle elevating mechanism, means for returning the needle to its initial position in contact with the record and means for rendering the elevating mechanism inoperative after the needle has been returned to its initial position.

2. A repeating device for talking machines comprising, in combination with the sound box of the machine, a track to receive a member which is secured to the sound reproducing box, a continuously movable member which is operated from the motive power of the machine, a cam member, means for locking the cam-member against operation, means operable by the member on the sound reproducing box for releasing the locking device of the cam member and for connecting the continuously operable member thereto to effect the release of the cam member, the track being operable by the cam member for raising the needle from the record and for returning the needle to its initial position on the record, and means for rendering the cam member inoperable when the needle is returned to its initial position.

3. In a record repeating device for talking machines, the combination with the sound box of the machine, of an arm secured to the sound box, a track for the arm as the needle travels inward on the record, an elevating and returning track for lifting the needle from the record and for carrying it back to its initial position on the record, a cam barrel for elevating the return track, said barrel having an edge to retain the track elevated during the descent of the needle, means for retaining the barrel in an inoperative position, means on the track and operable by the arm on the sound box to effect the release of the barrel and for connecting the barrel to the motor of the instrument.

4. A device for automatically and continuously repeating the playing of a phonographic record and comprising, in combination, a base piece, a disk, an elastic element secured to the disk for engaging the upper surface of the record for imparting rotary motion from the record to the disk, a shaft connected to the disk, a cam on the shaft, a rack-bar connecting means between the shaft and bar for imparting a reciprocating motion to said bar, a part carried by the needle carrying arm of the machine, a track to receive said part at the inner end of its travel and for lifting the needle from and returning the same to its initial position on the record, means for operating the track, and means connected to the rack bar for putting the track lifting means into operation.

5. A device for automatically and continuously repeating the playing of a phonographic record and comprising, in combination, a base piece, a disk, an elastic element secured to the disk for engaging the upper surface of the record for imparting rotary motion from the record to the disk, a shaft connected to the disk, a cam on the shaft, a rack bar, connecting means between the shaft and bar for imparting a reciprocating motion to said bar, a part carried by the needle carrying arm of the machine, a track to receive said part at the inner edge of its travel and for lifting the needle from and returning the same to its initial position on the record, means for operating the track and means connected to the rack bar for putting the track lifting means into operation, and means for automatically disconnecting the track operating means from the shaft as the needle is returned to its initial position on the record.

6. A device for automatically and continuously repeating the playing of a phonographic record and comprising, in combination, a base piece, a disk, an elastic element secured to the disk for engaging the upper surface of the record for imparting rotary motion from the record to the disk, a shaft connected to the disk, a cam on the shaft, a rack bar, connecting means between the shaft and bar for imparting a reciprocating motion to said bar, a part carried by the needle carrying arm of the machine, a track to receive said part at the inner edge of its travel and for lifting the needle from and returning the same to its initial position on the record, means for operating the track and means connected to the rack bar for putting the track lifting means into operation, and means comprising a cam device operable from the track lifting means for rendering the device inoperative.

7. A device for repeating the playing of a phonographic record and having, in combination, a base piece, a part carried by the needle supporting arm, a track on which the part travels during the playing of the record, a shaft, friction means for operating the shaft from the record, a second track upon which the part travels during the return of the needle to its initial position, means operable from the shaft for elevating and depressing the second track, means for rendering the said track elevating means inoperative during the playing of the record, means continuously operated by the record, a latch operated by said part for connecting the motive power of the machine to set the track elevating means into operation when the part on the needle carrying arm reaches the inward position of the travel of the arm, clutch means operated by the track elevating and depressing means to disconnect the motive power from the track elevating means when the needle reaches its initial position.

8. In a device of the kind described, the combination with a base piece pivotally connected to the machine, a shaft loosely extending through the base piece to provide for the unevenness of the rotation of the record, friction means for connecting the shaft to the record, a cam on the shaft, a rack bar continuously operated during the operation of the record, a part on the needle carrying arm, a track for the part, a pawl on the track for engaging the rack bar when the needle reaches the end of its inward travel for connecting the track to the rack, means for elevating and returning the needle, said pawl serving to release the needle elevating means from its normal position of rest, a cam device for initially operating the needle elevating means before the elevating means is fully connected to the motive power of the machine and clutch means for connecting and disconnecting the needle returning means to the machine.

9. In a phonographic record repeating device, the combination with the base piece, a post secured thereto, a barrel rotatably mounted on the post and having cam surfaces and a horizontal part between the cam surfaces, a track arm pivotally connected to the base piece and having a roller for engaging the cam surfaces for raising and lowering the track arm as the barrel is rotated, said arm having a part on the needle carrying arm engaging the track for returning the needle to its initial position, spring actuated means mounted on the hub of the barrel for effecting the connection and disconnection of the motive power of the machine to operate the barrel, and means for initially moving the barrel prior to the operation of connecting means.

10. In a repeating device of the kind described, a disk having finger elements, a rubber or elastic member looped over the finger elements and passed below the disk for engaging the record to cause the operation of the disk from the record.

11. A repeating device for phonographic machines, comprising a base piece, having an opening to loosely receive a shaft that is operated from the record on the machine, a barrel member rotatably mounted on the base piece, a train of gearing between the shaft and barrel, a clutch device operable from the barrel member for effecting an operative connection between the shaft and the barrel, a cam device for operating the clutch device, and means controlled by the barrel for rendering the same inoperative during the playing of the record, and a track operated by the barrel for lifting the needle from the record and returning the same to its initial position on the record.

12. A repeating device for playing a phonographic record comprising, in combination, a base piece pivotally connected to the instrument to permit the insertion of the record, a cam barrel rotatably mounted on the base piece and formed with two cam surfaces, one to serve as elevating means for lifting the needle from the record and the other for lowering the needle on to the record, a track engaging the cam surfaces to receive a part connected to the needle carrying arm of the machine, means for operating the barrel from the motive power of the machine, means for rendering the barrel inoperative, means including a cam device carried by the barrel for setting the barrel operating devices into operation, and for releasing the same, and a cam device for actuating the barrel after the same is released and before it is connected to the motive power of the machine.

13. A repeating device for a talking machine comprising, in combination, a needle carrying member, a track pivotally connected thereto, means on the needle-carrying member of the machine for engaging the track, a needle-raising arm, an intermittently operated member for elevating and lowering the arm, means for releasing said member when the needle reaches the end of the record being played, means for imparting an initial movement to the member simultaneously with its release and means for automatically operating the member from the motor of the machine after its release.

14. A repeat playing device for talking machines, comprising in combination, a needle carrying member, a base piece, an adjustable track for playing records of different sizes, a pivotally mounted part carried by the needle carrying member and engaging the track, an arm for elevating the needle, an intermittently operated arm elevating and lowering member comprising a cam barrel for returning the needle to its initial position, operative means between the motor of the machine and the arm elevating and lowering cam barrel member for setting of said member into operation when the needle reaches a predetermined point on the record depending upon the adjustment of the track, and means for automatically rendering the arm elevating cam barrel member inoperative after the needle has been returned to its initial position on the record.

15. A device for repeating the playing of a record of a talking machine and comprising, in combination, a normally stationary member for elevating, returning and lowering the needle, operative connections between the motor of the machine and said member, means actuated by the needle-carrying member for setting the said member into operation, and means for automatically stopping said member after the needle has been returned and lowered.

16. A device for repeating the playing of a record of a talking machine and comprising, in combination, a needle carrying member, a normally stationary member for elevating, returning and lowering the needle, operative connections between the motor of the machine and said member, means actuated by the needle-carrying member for setting the said member into operation, and means for automatically stopping said member after the needle has been returned and lowered, and comprising a cam operated by the needle elevating, returning and lowering member, a member operated by the cam for disconnecting the motor of the machine from the needle elevating, returning and lowering member.

CHARLES H. FRINK.